U.S. Patent  Aug. 9, 1983  4,397,500
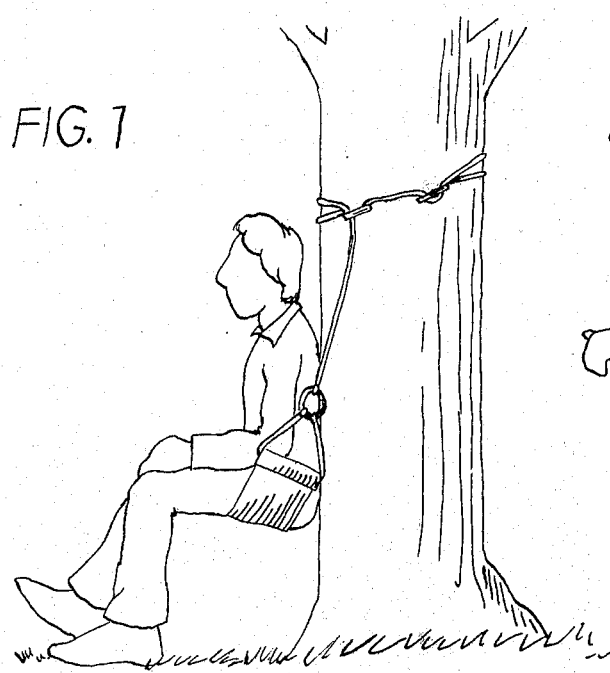
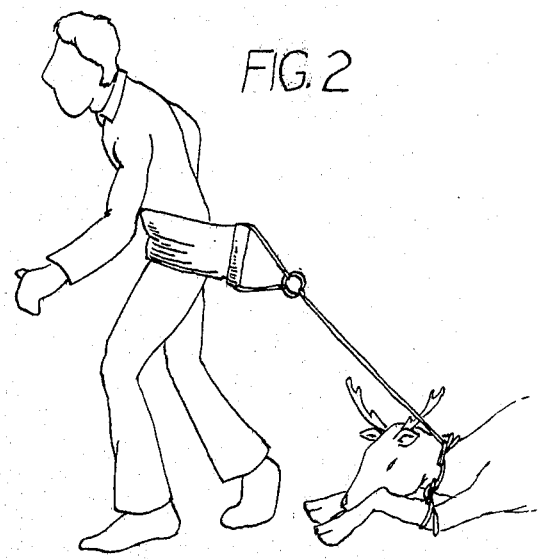
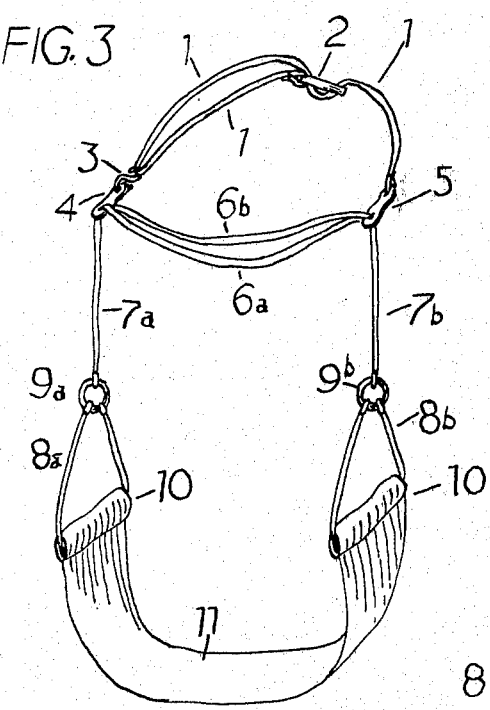
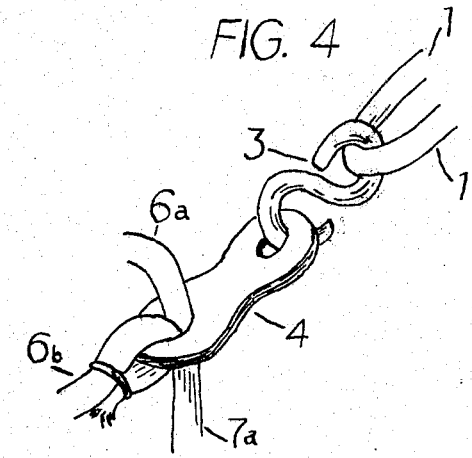
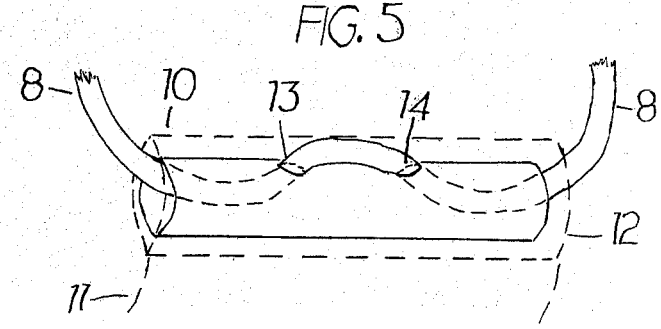

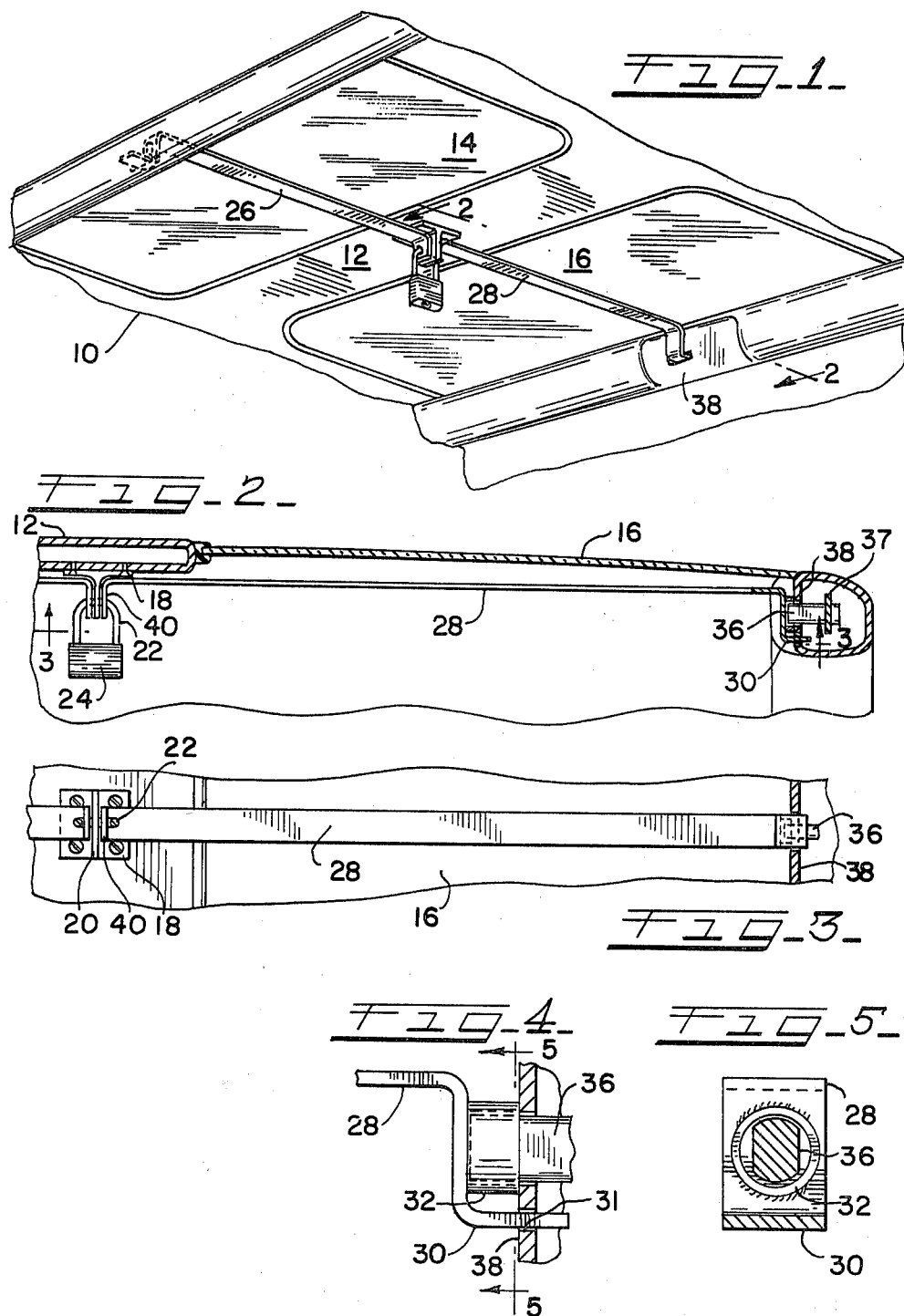

4,397,500

PORTABLE OUTDOORSMAN'S SEAT

BACKGROUND OF THE INVENTION

The invention pertains to portable seating devices. More specifically, the invention relates to folding or collapsible seats which can be carried by outdoorsmen, such as hunters, and erected in the field.

There have been many variations on portable seats for hunters and other outdoorsmen placed on the market. Most of these seats are designed to be carried on the hunter's back, as in Rischar, U.S. Pat. Nos. 3,985,387; or at the user's waist, as in Moody, 2,736,030, Amato, 3,895,839, or Caldwell, 4,232,896; or a combination of the two, as in Besch, 2,664,939. Although they have met with some success, all of these designs which hang from the user have tended to be bulky and heavy to carry, and uncomfortable to wear, the dangling seat tending to catch on branches and shrubs and hit the user on the legs. The straps required can be confining and a nuisance while wearing heavy clothing.

Moreover, many of the prior art designs have required a stump, log, or rock of convenient size (as in Pekala, U.S. Pat. No. 4,025,105 or Moody), or a spot of hard, level ground, as in Rischar. Such supports are often not to be found at the ideal location for hunting or birdwatching.

The collapsing designs are often complicated to use, and require parts which unfold (Amato or Caldwell) or telescope, or both (Rischar). This increases the weight to be carried, and diminishes the ease of use.

The solution to the problem of supporting the seat is to hang it from above, from the trunk of a tree, as in Woodward, U.S. Pat. No. 2,851,085. The Woodward invention is an improvement over the previously discussed designs, in that the user is shielded from the rear, and the seat does not need to be supported from the ground. Woodward, however, has a rigid frame which must be assembled before use, thus sharing the problems of complexity and weight with the other collapsible designs. The height of the seat is determined by the height at which the chain is placed on the tree, and is not adjustable. This poses problems when the seat cannot be strapped to the tree at the best height, for example because of branching. In transit, the seat is hung from the user's waist, with all of the problems previously discussed. The tilt of the seat is not adjustable. In common with other designs using metal parts, the chain and other metal parts of the Woodward seat tends to make noise as it is carried, which makes it undesirable to carry when stalking animals.

Thus, it is an object of the invention to provide an outdoors seat which can be suspended from any convenient tree, and which is fully adjustable, in that it may allow for variations in the girth of the tree, the height desired, and the tilt of the seat.

It is a further object of the invention to provide a fully adjustable, light seat for outdoorsmen which can be easily and quietly carried, as by putting it in user's pocket.

It is a still further object of the invention to provide a fully adjustable portable seat which can be easily used without complicated mechanical assembly.

Earlier versions of the product described herein were attempts by the inventor to achieve the objects described above. All versions of the product comprise a sling-type seat which may be suspended from a tree by an integral rope harness.

The design is light to carry, and rolls up into a small package which may easily be placed in a jacket pocket. It provides for adjustment of both the height of the seat above the ground and for the girth of the tree. There are no chains which generate noise which can frighten animals.

The only action required to use the seat is to unroll it and hook the rope strap around the trunk of the tree. No assembly is required.

The seat may also be used as a harness to enable the user to drag deer, sleds, skiers, or other heavy loads in the field.

SUMMARY OF THE INVENTION

The current invention represents an improvement over the earlier designs. The original seat used "s" hooks at all places where the pieces of rope are joined. These could not be closed completely, and tended to pull apart once closed, with the result that the user would have to untangle the ropes and reassemble the seat before using. This obviated several of the advantages of the invention. In addition, the "s" hooks tended to be expensive and difficult to produce, and required modification before manufacture of the product.

These "s" hooks have been replaced in the current invention by solid plates having several holes through which the rope is threaded. These plates are most commonly used as length adjusters for tent ropes, and will be referred to as "adjusters" in this disclosure. Since they are solid, they cannot pull apart and can be used without modification.

The current invention also represents an advance over earlier seat designs. Earlier versions even of the same seat used solid pipes as sleeves along the sides of the sling seat. This resulted in some penalty in weight. More important, the metal frayed the side ropes as the ropes moved inside the pipe, possibly leading in time to collapse of the seat. The tendency of the rope to slide freely made it impossible to adjust the tilt of the seat for the comfort of the user.

Under the teachings of the invention, the ropes along the side of the seat are threaded through holes in the sides of the sleeves, which sleeves are preferably made of a plastic pipe, such as PVC tubing. This allows adjustment of the tilt of the seat, and eliminates the wear problem caused by relative movement of the sleeve and the rope. The plastic pipe is lighter than the steel, and, being softer and smoother than steel, frays the rope less at the points where the two make contact.

DESCRIPTION OF THE DRAWINGS

FIG. 1 shows a view of the invention in use as a seat, suspended from a tree trunk.

FIG. 2 shows the invention used as a deer drag.

FIG. 3 is an overall view of the invention.

FIG. 4 is a detail of the disconnecting part of the strap, and also shows the arrangement of the ropes and the adjusters.

FIG. 5 is a detail of the sleeve at one end of the seat.

DESCRIPTION OF THE PREFERRED EMBODIMENT

In each figure the reference numbers are the same, thus each number will always refer to the same part. The letters "a" or "b" denote with which side rope an otherwise identical part is associated.

Referring to FIG. 3, the preferred embodiment of the invention has a cloth sling-type seat (11). A light canvas is preferable for durability and weight considerations, but any other flexible material, for example a vinyl, could be used as well. The ends of the seat material are folded back to form pockets (10), through which the supporting ropes (8) are run.

FIG. 5 shows a detail of the interior of one pocket. A rigid sleeve (12) (preferably made of PVC pipe) is inserted into the pocket. The rope (8) enters the sleeve through one end, is looped outside the sleeve (while remaining inside the cloth pocket), and then back inside, via two holes (13) and (14), then exits through the opposite end of the sleeve from which it entered. The holes divide the sleeve approximately into thirds. The friction provided by the arrangement of the rope (8), sleeve (12), and holes (13,14) allows the seat to be held in place on the triangular support formed by rope (8) without slipping, thus fixing the tilt of the seat relative to the side ropes (7). The tilt is made adjustable by sliding the rope through the sleeve, changing the geometry of the triangle.

The apex of the triangular support ropes (8) is formed by fastening the ends of the rope which is threaded through the sleeve (8) to a single point of attachment, shown in the drawing as a ring (9). The side ropes (7) also attach to the same point. Although a ring is shown, it will be understood that the actual device chosen for the attachment is not critical. The "ring" may be any closed structure, such as a washer or an adjuster such as is used at (4) or (5).

As detailed in FIG. 4, the side ropes (7) pass through a device such as the flat "FIG. 8" shown (4), which is preferably the sort of flat piece of metal most commonly used as a tent-rope length adjuster. The adjusters are commonly available, need no modification, and cannot open up and free the rope to tangle, as "s" hooks will.

The support structure above the triangular support ropes (8) is made up of two side ropes (a,b) and a third which wraps around the tree trunk (1). Referring to FIGS. 3 and 4, it can be seen that the left side rope (7a) passes through adjuster (4) and becomes cross-rope (6a), ending at adjuster (5). Similarly, the right side rope (7b) passes through adjuster (5), becoming cross-rope (6b), and fastens to adjuster (4), as detailed in FIG. 4.

As will be seen, then, the relationship of lengths (6) and (7) of each rope (a and b) determines the height of the seat, relative to the point on the trunk of the tree at which the seat is strapped. To raise the seat, cross-rope segment (6) is lengthened, and side rope segment (7) shortened. Both ropes (a,b) are automatically adjusted equally, thus ensuring that the seat hangs in a level fashion.

Rope (1) and adjuster (2) form an adjustable strap which passes around the girth of tree, connecting to adjuster (4) by means of an "s" hook (3). Movement of the adjuster (2) changes the length of the strap, thus allowing the seat to be suspended from the trunk of varying-sized trees. Adjustment of the length of rope segments (6) provides a secondary adjustment for different tree sizes.

In use, as shown in FIG. 1, the strap (1) is passed around the tree trunk and hooked to the adjuster (4) on the other side. The lengths of rope segments (6) and (7) are set so that the seat hangs at the correct height, and the length of the strap is adjusted so as to grip the tree trunk firmly. The geometry of the triangular rope segments (8) is altered by sliding the rope within the sleeve to set the desired angle of the seat.

When needed, the seat portion can be passed around the user's waist, as shown in FIG. 2, and the strap tightened around the load to be dragged, in this instance a deer. The strap draws the deer's legs and neck together, and the hunter can then drag the deer out of the woods conveniently. The wide seat (11) serves as a harness, to effectively spread the load forces across the user's body.

Accordingly, it is to be understood that the embodiment of the invention herein described is merely illustrative of the application of the principles of the invention. Reference herein to details of the illustrated embodiment is not intended to limit the scope of the claims, which themselves recite those features regarded as essential to this invention.

I claim:

1. A portable seat intended to be hung from the trunk of a tree, comprising:
   a. sling seat means for supporting an occupant having at each of its ends a portion folded back upon itself defining a pocket;
   b. two rigid sleeves, one for fitting within each pocket;
   c. each of said sleeves having two holes perpendicular to the long axis thereof, and spaced along the length thereof, dividing the sleeve into three segments;
   d. rope means passing through each of the sleeves, for hanging the seat from a support located above;
   e. the rope of each of said rope means passing into each of said sleeves, out of the interior of said sleeve throiugh one of the holes, back into the interior of the sleeve through the other hole, and exiting through the opposite end of the sleeve from which it entered;
   f. said arrangement of the rope means and the sleeves being usable to adjust the tilt of the seat relative to the support.

2. The seat of claim 1, in which the rope means for hanging the seat from a support comprises:
   a. strap means for surrounding the girth of a tree, having ring means for attaching rope at each end, one of said ring means being disconnectable from said strap means;
   b. said strap means being alterable in length, so as to adjust for differing tree girths;
   c. said ring means comprising a solid plate having a plurality of holes;
   d. two ropes, each associated withh one of said sleeves, and identical with the rope means associated with the other sleeve, and each comprising:
      1. a triangular portion having a base, defined by the sleeve, and an apex opposite the base, defined by the intersection of the two ends of the rope portion;
      2. a single supporting piece connected to the apex of the triangular portion, passing through one of said ring means at one end of the strap means, and fastening to the other ring means at the opposite end of the strap means, such that the supporting piece comprises two segments, a first side rope part providing support for the seat means, and adjustment of its height, and a second cross-rope part allowing adjustment for the girth of the tree.

3. The portable seat of claim 2 in which the solid plate having a plurality of holes is a "figure eight" tent-rope adjuster.

* * * * *